United States Patent

Ban

(10) Patent No.: US 8,914,457 B2
(45) Date of Patent: Dec. 16, 2014

(54) CACHING OF NODES IN CACHE CLUSTER

(75) Inventor: Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 1226 days.

(21) Appl. No.: 12/574,669

(22) Filed: Oct. 6, 2009

(65) Prior Publication Data

US 2011/0082908 A1    Apr. 7, 2011

(51) Int. Cl.
*G06F 15/167*    (2006.01)
*G06F 12/08*    (2006.01)
*G06F 11/16*    (2006.01)
*G06F 11/20*    (2006.01)

(52) U.S. Cl.
CPC .......... *G06F 12/0813* (2013.01); *G06F 11/202* (2013.01); *G06F 11/1658* (2013.01)
USPC ............. 709/213; 709/214; 709/219

(58) Field of Classification Search
CPC   G06F 11/1658; G06F 11/202; G06F 12/0813
USPC ............. 709/213, 214, 219; 711/162
See application file for complete search history.

(56) References Cited

U.S. PATENT DOCUMENTS

| | | | |
|---|---|---|---|
| 7,206,836 B2* | 4/2007 | Dinker et al. | 709/224 |
| 7,974,221 B2* | 7/2011 | Tamassia et al. | 370/256 |
| 2007/0282915 A1* | 12/2007 | Vosshall et al. | 707/200 |
| 2011/0184920 A1* | 7/2011 | Vosshall et al. | 707/690 |
| 2012/0011398 A1* | 1/2012 | Eckhardt et al. | 714/15 |
| 2013/0073691 A1* | 3/2013 | Quan et al. | 709/219 |

OTHER PUBLICATIONS

Bela Ban, JBOSS, A Memcached Implementation in JGroups, Sep. 2008, 11 pages, Memchached article: http://jgroups.org/javagroupsnew/docs/memcached.html.
Oracle ® Coherence, User's Guide for Oracle Coherence *Web, Release 3.5, E14536-01, Jun. 2009, pp. 1-82.

* cited by examiner

*Primary Examiner* — Mohamed Wasel
(74) *Attorney, Agent, or Firm* — Lowenstein Sandler LLP

(57) ABSTRACT

A replication count of a data element of a node of a cache cluster is defined. The data element has a key-value pair where the node is selected based on a hash of the key and a size of the cache cluster. The data element is replicated to at least one other node of the cache cluster based on the replication count.

20 Claims, 5 Drawing Sheets

CACHING OF NODES IN CACHE CLUSTER

TECHNICAL FIELD

Embodiments of the present invention relate to group communication, and more specifically to caching data and processes.

BACKGROUND

Group communication protocol designed for multicast communication may be used to communicate messages between endpoints forming a group. Communication endpoints can be processes or objects, or any entity that can send and receive messages to/from a group.

Replication of data to other nodes in a cluster node is a common technique to provide highly available data and minimize access to a database. However, if every node were to replicate all of its data to every other nodes from the cluster, the amount of memory available for data is significantly reduced.

BRIEF DESCRIPTION OF THE DRAWINGS

The present invention is illustrated by way of example, and not by way of limitation, in the figures of the accompanying drawings and in which.

DETAILED DESCRIPTION

Figure 1:
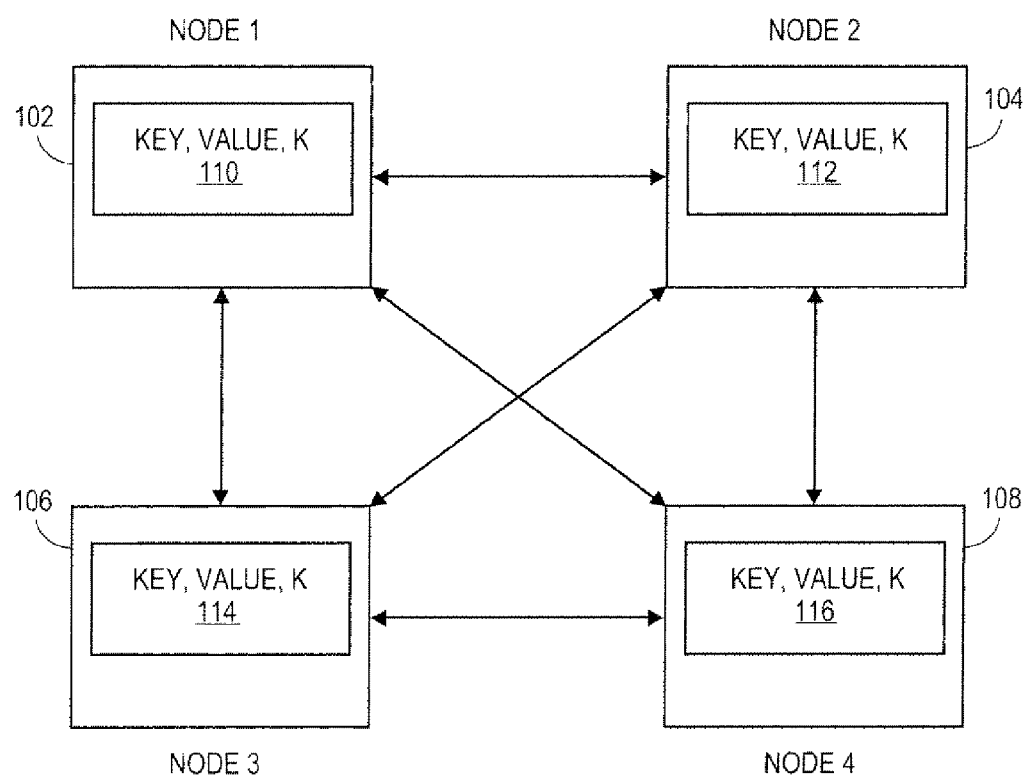
FIG. 1 illustrates a block diagram of one embodiment of a cluster of nodes.

Described herein is a method and apparatus for data replication in a cache cluster. A replication count of a data element of a node of a cache cluster is defined. The data element has a key-value pair where the node is selected based on a hash of the key and a size of the cache cluster. In one embodiment, a consistent hashing is used. The data element is replicated to at least one other node of the cache cluster based on the replication count.

Memcached

Memory caching (also referred to as Memcached) is a cache, which can be distributed across a number of hosts. It is a hashmap that stores key/value pairs. Its main methods are SET(K,V) which adds a key/value pair. GET(K) returns a value for a previously inserted key and DELETE(K) removes a key/value pair.

Memcached is started on a given host and listens on a given port (for example, port 11211 is the default port). In one embodiment, the daemon is written in C, but clients can be written in any language and talk to the daemon via the memcached protocol.

Typically, multiple memcached daemons are started on different hosts. The clients are passed a list of memcached addresses (IP address and port) and pick one daemon for a given key. This is done via consistent hashing, which maps the same key K to the same memcached server S. When a server crashes, or a new server is added, consistent hashing makes sure that the ensuing rehashing is minimal. This means that most keys still map to the same servers, but keys hashed to a removed server are rehashed to a new server.

Memcached does not provide any redundancy (e.g. via replica on of its hashmap entries); when a server S is stopped or crashes, all key/value pairs hosted by server S are lost.

The main goal of memcached is to provide a large distributed cache sitting in front of a database DB (or file system). Applications typically ask the cache for an element and return it when found, or else ask the DB for it. In the latter case, the element is added to the cache before returning it to the client and will now be available from the cache on the next cache access.

This speeds up applications with good cache locality (e.g. fetching web pages), because even a round trip in a Local Area Network (LAN) is typically faster than a round trip to the DB server and the associated disk access.

In addition, clients now have a huge aggregated cache memory. If there are 10 memcached daemons of 2 GB memory each, then there is a 20 GB (virtual) cache. This is bigger than most physical memory sizes of most hosts.

For illustration purposes, a typical use of memcached includes an instance of Apache which serves HTTP requests and a Python client running in the mod_python Apache module. There are three instances of memcached started, on hosts A, B and C. The Python client is configured with a list of [A,B,C].

When a request hits the Python code that requires a DB lookup, the Python code first checks the cache by hashing the key to a server. Assuming K is hashed to C, so now the client sends a GET(K) request to C via the memcached protocol and waits for the result. If the result is not null, it is returned to the caller as an HTTP response. If not, the value for K is retrieved from the DB, inserted into the cache (on host C) and then returned to the client. This ensures that the next lookup for K (by any client) find K, V in the cache (on host C) and does not have to perform a DB lookup.

A modification to the DB is typically also followed by a cache insertion: so if K/V is modified, then SET(K,V,T) is executed against the cache after the DB insertion.

Distribution and Replication

Distribution therefore requires some stable storage (e.g. a DB) from which elements can be retrieved should a node hosting an element crash. In one embodiment, all writes are also written to the DB in this case.

Distribution is similar to RAID 0. If one does not want to use a database, e.g. because it is a single point of failure, and access to it is slow, one can keep the data in memory. However, to prevent data loss due to a node crash, all elements have to be replicated.

Replication is the opposite of distribution: a copy of a given element K is stored on every node. Should a node crash, clients can simply pick a different node and K is still present. Updates to K have to be sent to all nodes. Note that to prevent a catastrophic failure in which all nodes in the cloud crash, updates could still be written to the DB, but this could be done in the background.

While replication increases availability and prevents data loss, only 1 GB out of the 5 GB can effectively be used of the above example: if a node has 1 GB of data, and every node replicates its data to every other node in the 5 node cluster, the 5 GB available would be used up.

Replica ion is similar to RAID 1. So one can either choose to not replicate anything with potential data loss but maximal use of the 5 GB, or replicate everything to everyone, which minimizes the risk of data loss but limits us to 1 GB out of the 5 GB.

RAID 5 is a solution which does not replicate data ever where (it only replicates it K times where K<number of disks) and increases the use of the available size. However, K is fixed and for RAID 5 to work, at least 3 disks are needed.

ReplCache

ReplCache is a large virtual hashmap spanning multiple nodes, similar to memcached. If there are five processes (nodes) with 1 GB of memory allocated to each of their hashmap, then there is a virtual hashmap of 5 GB. By starting another node, the size would increase to 6 GB, and if a node leaves, the size shrinks accordingly.

FIG. 1 illustrates a block diagram of one embodiment of a cluster 100 of nodes 102, 104, 106, and 108. Each node includes corresponding data elements 110, 112, 114, and 116. As previously defined, data elements includes a key, a value, and a replication count K.

When elements (key and values) are distributed to the virtual hashmap, then—based on consistent hashing—an element gets assigned to a single node, and so the full 5 GB can be used. Reads and writes are always sent to the same node using the consistent hash of the key. If the node storing element K crashes, the next read returns null, and the user has to retrieve K from the database and re-insert it into the virtual hashmap, this time picking a different node.

ReplCache allows a developer to define how many times an element should be available a cluster. This is defined per data item with replication count (K):

K==-1: the element is stored on all duster nodes (full replication).

K==1: the element stored on a single node only, determined through consistent hashing (distribution). This is equivalent to Memcached.

K>1: the element is stored K times in the cluster.

If an element is important, and loss is catastrophic or recreation costly, then -1 should be chosen. If an element can easily be fetched from the database again, then 1 might be picked. A value greater than 1 decreases the risk of data loss and saves memory, e.g. if K==3 (N==10), then 3 cluster nodes have to crash at the same time to lose K. If they do not crash simultaneously, the cluster will rebalance its data so that K==3 (unless N<K).

The advantage of defining K per data element is that an application can define data reliability and thus use more of the virtual memory allocated.

Figure 2:
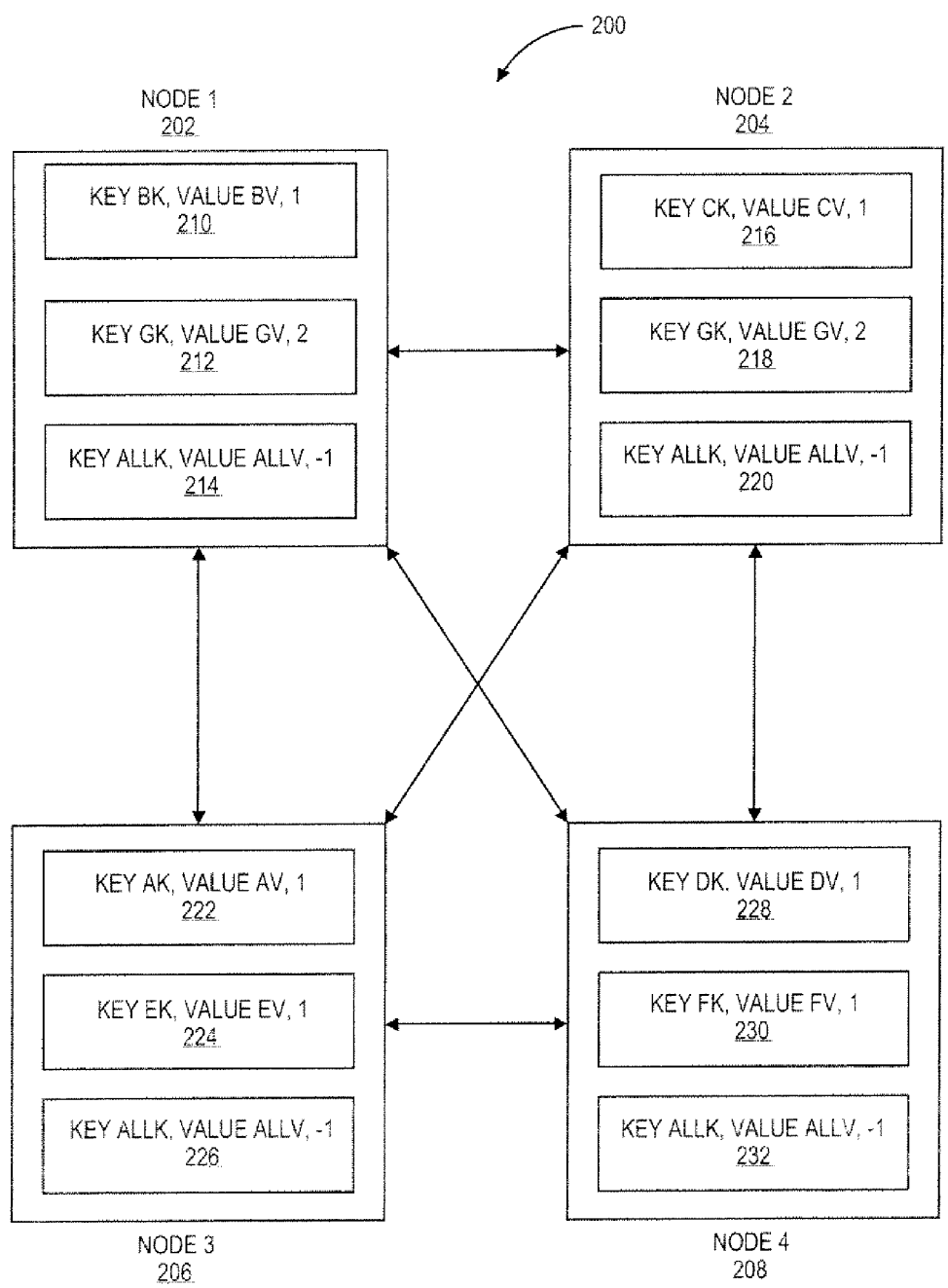
FIG. 2 illustrates a block diagram of an example of a cluster of nodes with dynamic cache replication.

FIG. 2 illustrates a block diagram of an example of a cluster 200 of nodes 202, 204, 206, 208 with dynamic cache replication. Data element 210 includes a replication count K of 1. So it is only stored on one node (e.g. node 202). Similarly data elements 216, 222, 228 are respectively individually stored on nodes 204, 206, and 208.

Data element 212 includes a replication count K of 2. So it is only stored on two nodes (e.g. nodes 202 and 204—data element 218).

Data element 214 includes a replication count K of -1. So it stored in every node (data element 220 in node 204, data element 226 in node 206, data element 232 in node 208.

Maintaining Replicas

Figure 3:
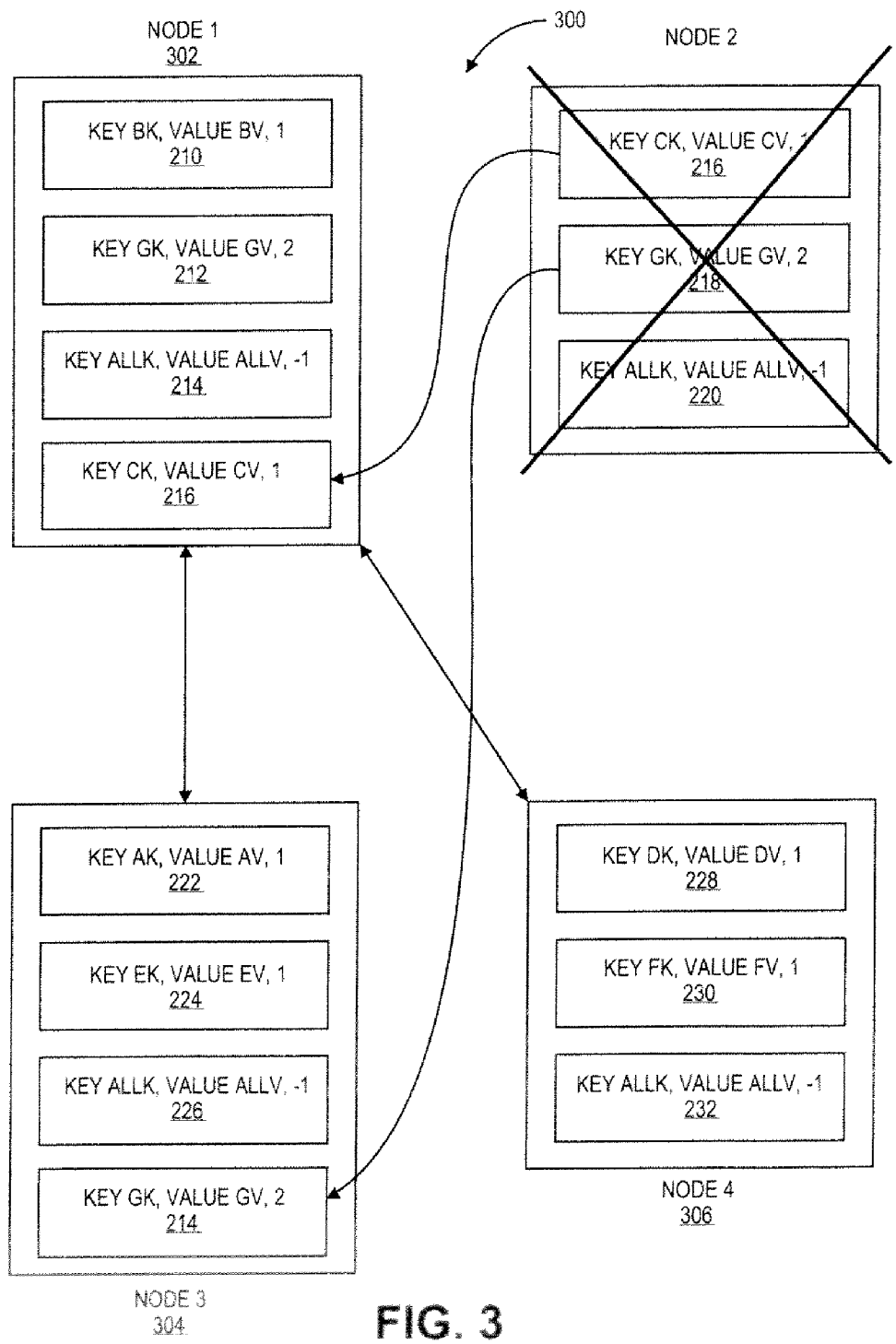
FIG. 3 illustrates a block diagram of another example of a cluster of nodes with dynamic cache replication.

When new nodes are added to the cluster, or removed from the cluster, ReplCache makes sure that elements with K==1 are still stored on the correct node, based on the consistent hash and the new cluster topology. FIG. 3 illustrates a block diagram of an example of a cluster 300 of nodes where a node crashes. In this example, data element 216 having a replication count of 1 is only copied to node 302 so that it is the only copy in cluster 300. Data element 218 having a replication count of 2 is only copied to node 304 so that there are two copies (one in node 302, and one in node 304). Data element 220 having a replication count of -1 is not copied since every node (302, 304, 306) in the cluster 300 already has a copy of data element 220.

As such, elements that are stored multiple times in the cluster (K>1), ReplCache has to make sure that elements are moved or copied to other nodes. For example, if id=322649 has K==3 and the cluster has nodes A and B, 'id' will be stored on A and B. As soon as C is added, 'id' is copied to C in order to have 3 copies available. When D is added, one has to figure out whether to store 'id' on D, too. If that's the case, 'id' can be removed on either A, B or C.

To handle the latter case (K>1), K hash codes are computed for the changed cluster topology and pick K nodes (NEW-NODES). K hash codes are computed for the old cluster topology and pick K nodes (OLD-NODES). If NEW-NODES is the same as OLD-NODES, there is no need to rebalance a given element. If not, PUT is multicast, which every node receives. Every node then checks whether it is in the NEW-NODES set for the given key and applies the PUT if so, or discards it if not.

Figure 4:
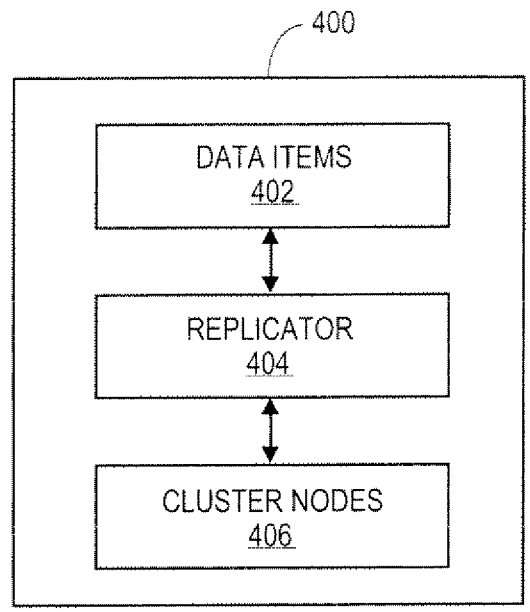
FIG. 4 illustrates a block diagram one embodiment of a dynamic cache node replicator.

FIG. 4 illustrates a block diagram of one embodiment of a dynamic cache node replicator 400. Dynamic cache node replicator 400 includes data elements 402, data elements replicator 404, and cluster nodes 406. Data elements replicator 404 replicates each data element into a corresponding node of a cluster based on a corresponding replication count in such a manner as to balance the load of the cluster.

Figure 5:
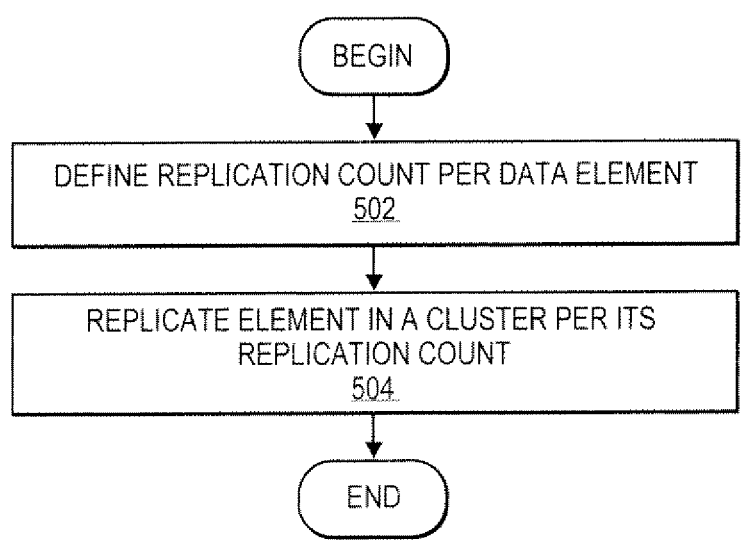
FIG. 5 illustrates a flow diagram of one embodiment of a method for replicating cache nodes in a cluster.

FIG. 5 illustrates a flow diagram of one embodiment of a method for replicating cache nodes in a cluster. At 502, a replication count for a data element is defined. At 504, the data element s replicated and distributed across nodes of a cluster pursuant to its replication count K.

Figure 6:
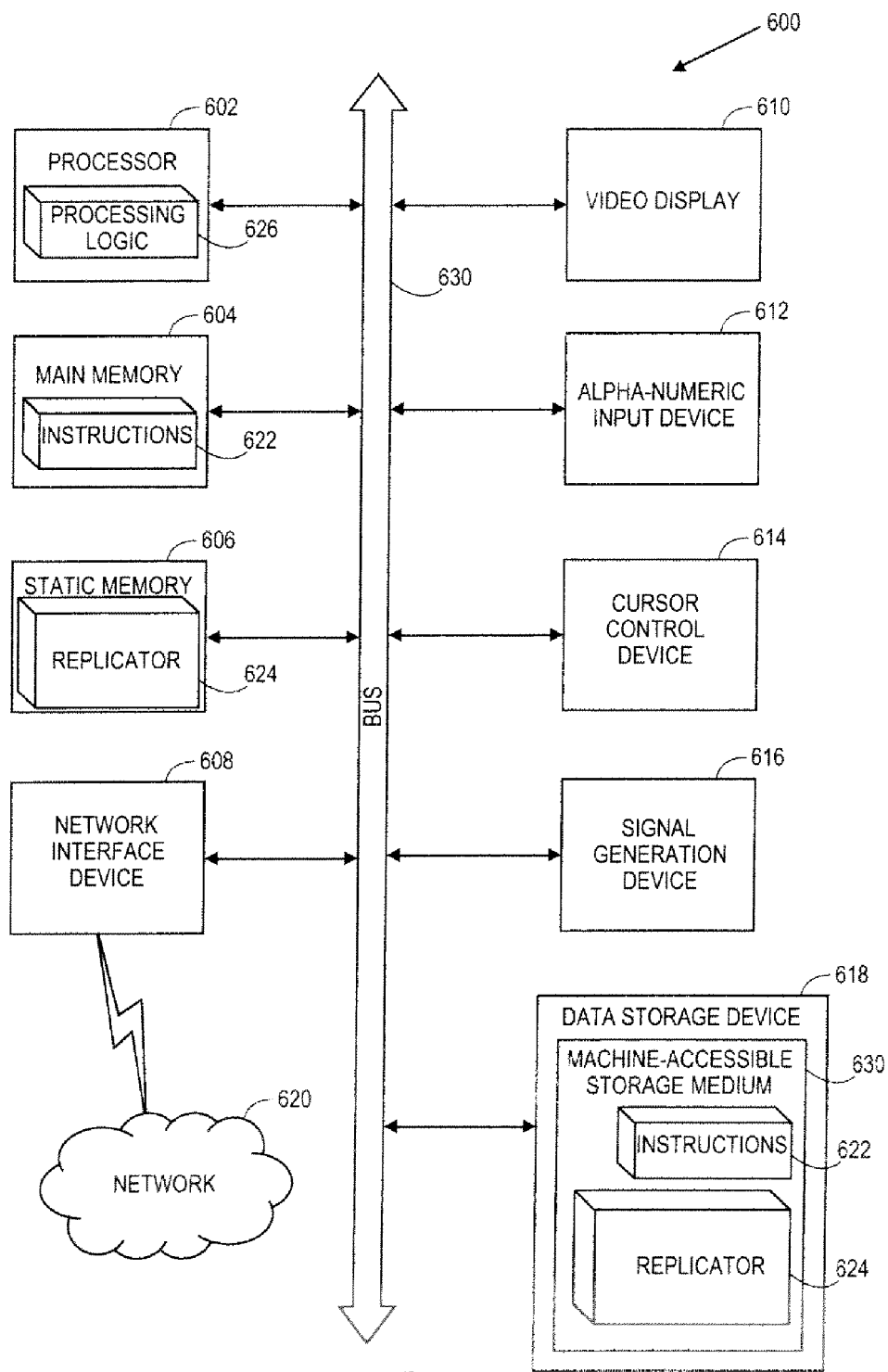
FIG. 6 illustrates a block diagram of an exemplary computer system

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, are extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC)

microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute modules 626 (previously described with respect to FIG. 1) for performing the operations and steps discussed herein with. In one embodiment, the modules may be include hardware or software or a combination of both. In another embodiment, processing device 602 includes a pure function identifier module 628.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-accessible storage medium 630 on which is stored one or more sets of instructions embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting computer-accessible storage media. The software 622 may further be transmitted or received over a network 620 via the network interface device 608.

The computer-accessible storage medium 630 may also be used to store ReplCache 624 as presently described. ReplCache 624 may also be stored in other sections of computer system 600, such as static memory 606.

While the computer-accessible storage medium 630 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "defining" or "replicating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A method, comprising:
defining, in view of at least one of an importance of a data element and an ability to re-create the data element, a replication count of the data element residing in a cache cluster;
selecting, by a processing device, a first node of the cache cluster in view of the replication count and a hash of the data element,
replicating the data element to the first node;
responsive to determining that the first node has been removed from the cache cluster, selecting a second node of the cache cluster in view of the replication count and the hash of the data element; and
replicating the data element to the second node.

2. The method of claim 1, further comprising:
receiving a request from an application for the data element;
retrieving the data element from the second node; and
sending the data element to the application.

3. The method of claim 2, further comprising:
determining that the data element cannot be retrieved from the cache cluster;
retrieving the data element from a database; and
copying the data element to a node of the cache cluster.

4. The of claim 1 wherein the replicating is performed to all nodes of the cache cluster if the replication count is equal to −1.

5. The method of claim 1 wherein the replicating is performed to at least K nodes of the cache cluster if the replication count is equal to a positive integer K.

6. A non-transitory computer-readable storage medium, comprising executable instructions which, when executed by a processing device, cause the processing device to perform operations comprising:
defining, in view of at least one of an importance of a data element and an ability to re-create the data element, a replication count of the data element residing in a cache cluster;
selecting, by the processing device, a first node of the cache cluster in view of the replication count and a hash of the data element,
replicating the data element to the first node of the cache cluster;
responsive to determining that the first node has been removed from the cache cluster, selecting a second node of the cache cluster in view of the replication count and the hash of the data element; and
replicating the data element to the second node.

7. The non-transitory computer-readable storage medium of claim 6, wherein the operations further comprise:
receiving a request from an application for the data element;
retrieving the data element from the second node; and
sending the data element to the application.

8. The non-transitory computer-readable storage medium of claim 7, wherein the operations further comprise:
determining that the data element cannot be retrieved from the cache cluster;
accessing the data element from a database; and
copying the data element a node of the cache cluster.

9. The non-transitory computer-readable storage medium of claim 6, wherein the replicating is performed to all nodes of the cache cluster if the replication count is equal to −1.

10. The non-transitory computer-readable storage medium of claim 6, wherein the replicating is performed to at least K nodes of the cache cluster if the replication count is equal to a positive integer K.

11. A system, comprising:
a memory;
a processing device coupled to the memory, the processing device configured to:
define, in view of at least one of an importance of a data element and an ability to re-create the data element, a replication count of the data element residing in a cache cluster;
select a first node of the cache cluster in view of the replication count and a hash of the data element,
replicate the data element to the first node of the cache cluster,
responsive to determining that the first node has been removed from the cache cluster, select a second node of the cache cluster in view of the replication count and the hash of the data element; and
replicate the data element to the second node.

12. The system of claim 11, wherein the processing device is further configured to:
receive a request from an application for the data element;
retrieve the data element from the second node; and
send the data element to the application.

13. The system of claim 11, wherein the processing device is configured to replicate the data element to all nodes of the cache cluster if the replication count is equal to −1.

14. The system of claim 11, wherein the processing device is configured to replicate the data element to at least K nodes of the cache cluster if the replication count is equal to a positive integer K.

15. The method of claim 1, further comprising:
responsive to determining that the data element cannot be re-created, assigning a full replication value to the replication count of the data element.

16. The method of claim 1, further comprising:
transmitting, to a plurality of nodes of the cache cluster, a message including the hash of the data element.

17. The non-transitory computer-readable storage medium of claim 6, wherein the operations further comprise:
responsive to determining that the data element cannot be re-created, assigning a full replication value to the replication count of the data element.

18. The non-transitory computer-readable storage medium of claim 6, wherein the operations further comprise:
transmitting, to a plurality of nodes of the cache cluster, a message including the hash of the data element.

19. The system of claim 11, wherein the processing device is further configured to:
responsive to determining that the data element cannot be re-created, assign a full replication value to the replication count of the data element.

20. The system of claim 11, wherein the processing device is further configured to:
transmit, to a plurality of nodes of the cache cluster, a message including the hash of the data element.

* * * * *